United States Patent
Sasaki et al.

(10) Patent No.: US 11,480,827 B2
(45) Date of Patent: Oct. 25, 2022

(54) LIQUID CRYSTAL DISPLAY DEVICE

(71) Applicant: SHARP KABUSHIKI KAISHA, Osaka (JP)

(72) Inventors: Takahiro Sasaki, Osaka (JP); Takashi Satoh, Osaka (JP); Ming Ni, Osaka (JP); Shuji Nishi, Osaka (JP); Keiichi Ina, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/511,504

(22) Filed: Oct. 26, 2021

(65) Prior Publication Data
US 2022/0137457 A1 May 5, 2022

(30) Foreign Application Priority Data

Oct. 29, 2020 (JP) .............................. JP2020-181838

(51) Int. Cl.
*G02F 1/133* (2006.01)
*G02F 1/1335* (2006.01)
(Continued)

(52) U.S. Cl.
CPC .... *G02F 1/133553* (2013.01); *G02F 1/13439* (2013.01); *G02F 1/133345* (2013.01);
(Continued)

(58) Field of Classification Search
CPC ......... G02F 1/133553; G02F 1/133742; G02F 1/133345; G02F 1/133514;
(Continued)

(56) References Cited

U.S. PATENT DOCUMENTS 8,692,758 B2 4/2014 Matsuda et al.
2010/0026941 A1* 2/2010 Umeno ............ G02F 1/133555
349/114
(Continued)

FOREIGN PATENT DOCUMENTS

JP 2000-122094 A 4/2000
JP 3394926 B2 4/2003
(Continued)

*Primary Examiner* — Nathanael R Briggs
*Assistant Examiner* — William D Peterson
(74) *Attorney, Agent, or Firm* — ScienBiziP, P.C.

(57) ABSTRACT

A liquid crystal display device includes a first substrate, a second substrate, a vertical alignment liquid crystal layer, and a plurality of pixels. Each of the pixels includes a reflective region for performing display in a reflection mode. The first substrate includes a reflective electrode including a first region located within each of the plurality of pixels and a second region located between any two pixels, of the plurality of pixels, adjacent to each other, a transparent insulating layer provided to cover the reflective electrode, and a pixel electrode formed from a transparent conductive material and provided on the transparent insulating layer in each of the plurality of pixels. The second substrate includes a counter electrode provided to be opposite to the pixel electrode and the reflective electrode. Voltage of the same polarity is applied to the liquid crystal layer of any two pixels, of the plurality of pixels, adjacent to each other along a row direction, any two pixels, of the plurality of pixels, adjacent to each other along a column direction, or all of the plurality of pixels. The counter electrode and the reflective electrode are provided with potentials different from each other.

8 Claims, 13 Drawing Sheets

(51) Int. Cl.
  *G02F 1/1337* (2006.01)
  *G02F 1/1343* (2006.01)
  *G02F 1/1333* (2006.01)

(52) U.S. Cl.
  CPC .. *G02F 1/133514* (2013.01); *G02F 1/133742* (2021.01); *G02F 1/134336* (2013.01); *G02F 2203/01* (2013.01); *G02F 2203/30* (2013.01)

(58) Field of Classification Search
  CPC ........... G02F 1/134336; G02F 1/13439; G02F 2203/01; G02F 2203/30
  USPC ......................................................... 349/37
  See application file for complete search history.

(56) References Cited

U.S. PATENT DOCUMENTS

2010/0295841 A1  11/2010  Matsuda et al.
2013/0320334 A1  12/2013  Yamazaki et al.

FOREIGN PATENT DOCUMENTS

| JP | 2003-131268 A | 5/2003 |
| JP | 3469663 B2 | 11/2003 |
| JP | 5036864 B2 | 9/2012 |
| JP | 2014-007399 A | 1/2014 |

\* cited by examiner

LIQUID CRYSTAL DISPLAY DEVICE

CROSS-REFERENCE TO RELATED APPLICATIONS

This application claims the benefit of priority to Japanese Patent Application Number 2020-181838 filed on Oct. 29, 2020. The entire contents of the above-identified application are hereby incorporated by reference.

BACKGROUND

Technical Field

The present disclosure relates to a liquid crystal display device, and particularly relates to a liquid crystal display device in which each pixel includes a reflective region.

Liquid crystal display devices are roughly classified into transmissive liquid crystal display devices and reflective liquid crystal display devices. Transmissive liquid crystal display devices perform display in a transmission mode using light emitted from a backlight. Reflective liquid crystal display devices perform display in a reflection mode using ambient light. A liquid crystal display device has been proposed in which each pixel includes a reflective region for displaying in the reflection mode, and a transmissive region for displaying in the transmission mode. Such a liquid crystal display device is referred to as a transflective or a transmissive/reflective liquid crystal display device.

Reflective and transflective liquid crystal display devices are, for example, suitable for use as medium or small display devices for mobile applications used outside. An example of the reflective liquid crystal display device is disclosed in JP 2000-122094 A. An example of the transflective liquid crystal display device is disclosed in JP 2003-131268 A.

SUMMARY

In reflective and transflective liquid crystal display devices, that is, liquid crystal display devices including a region (reflective region) in which each pixel performs displaying in the reflection mode, there has been a demand for further improving efficiency of use of light (reflectance) during display in the reflection mode (that is, for even brighter display in the reflection mode).

The present disclosure has been made in view of the task described above, and an object of the present disclosure is to improve reflectance and to achieve brighter display than that achieved in the related art in liquid crystal display devices including reflective regions in which each pixel performs displaying in the reflection mode.

The present specification discloses a liquid crystal display device according to the following items.

Item 1

A liquid crystal display device including:
a first substrate;
a second substrate opposite to the first substrate;
a vertical alignment liquid crystal layer provided between the first substrate and the second substrate; and
a plurality of pixels arranged in a matrix shape including a plurality of rows and a plurality of columns,
wherein each of the plurality of pixels includes a reflective region configured to perform display in a reflection mode,
the first substrate includes
a reflective electrode including a first region located within each of the plurality of pixels and a second region located between any two pixels, of the plurality of pixels, adjacent to each other,
a transparent insulating layer provided to cover the reflective electrode, and
a pixel electrode formed from a transparent conductive material and provided on the transparent insulating layer in each of the plurality of pixels,
the second substrate includes a counter electrode provided opposite to the pixel electrode and the reflective electrode,
voltage of the same polarity is applied to the liquid crystal layer of any two pixels, of the plurality of pixels, adjacent to each other along a row direction, any two pixels, of the plurality of pixels, adjacent to each other along a column direction, or all of the plurality of pixels, and
the counter electrode and the reflective electrode are provided with potentials different from each other.

Item 2

The liquid crystal display device according to item 1, wherein the reflective electrode is provided with a potential that is the same as a potential provided to the pixel electrode during maximum gray scale display.

Item 3

The liquid crystal display device according to item 1 or 2, wherein the second substrate does not include a black matrix between any two pixels adjacent to each other, among the plurality of pixels.

Item 4

The liquid crystal display device according to any one of items 1 to 3, wherein
the second substrate includes a color filter layer including a first color filter that transmits first color light, a second color filter that transmits second color light, and a third color filter that transmits third color light, and
the first color filter, the second color filter, and the third color filter do not overlap with each other when viewed in a display surface normal direction.

Item 5

The liquid crystal display device according to any one of items 1 to 4, wherein
each of the plurality of pixels further includes a transmissive region configured to perform display in a transmission mode, and
the pixel electrode is partially located in the transmissive region.

Item 6

The liquid crystal display device according to any one of items 1 to 5, wherein the counter electrode is formed from a transparent conductive material.

Item 7

The liquid crystal display device according to any one of items 1 to 6, further including:
memory circuits connected to the plurality of pixels, respectively.

Item 8

The liquid crystal display device according to any one of items 1 to 7, wherein the first region and the second region of the reflective electrode each have a concave-convex surface structure.

With embodiments of the present disclosure, it is possible to improve reflectance from known configurations to achieve brighter displaying than that achieved by known configurations in liquid crystal display devices including reflective regions in which each pixel performs display in the reflection mode.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments of the present disclosure will be described with reference to the accompanying drawings. Note that the present disclosure is not limited to the embodiments to be described below.

First Embodiment

Figure 1:
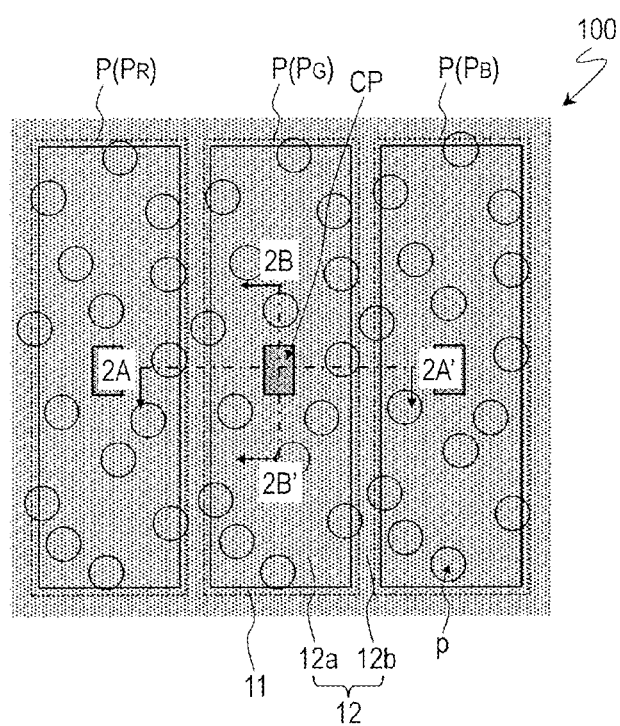
FIG. 1 is a plan view schematically illustrating a liquid crystal display device 100 according to an embodiment of the present disclosure and illustrates a region corresponding to three pixels P of the liquid crystal display device 100.
Figure 2A:
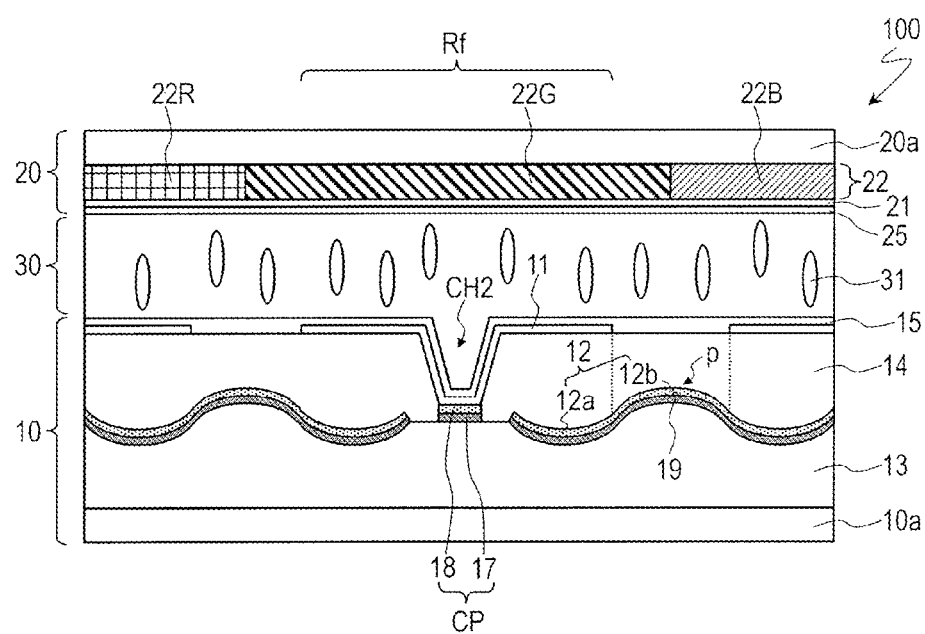
FIG. 2A is a cross-sectional view schematically illustrating the liquid crystal display device 100 and illustrates a cross-sectional structure along a line 2A-2A' in FIG. 1.
Figure 2B:
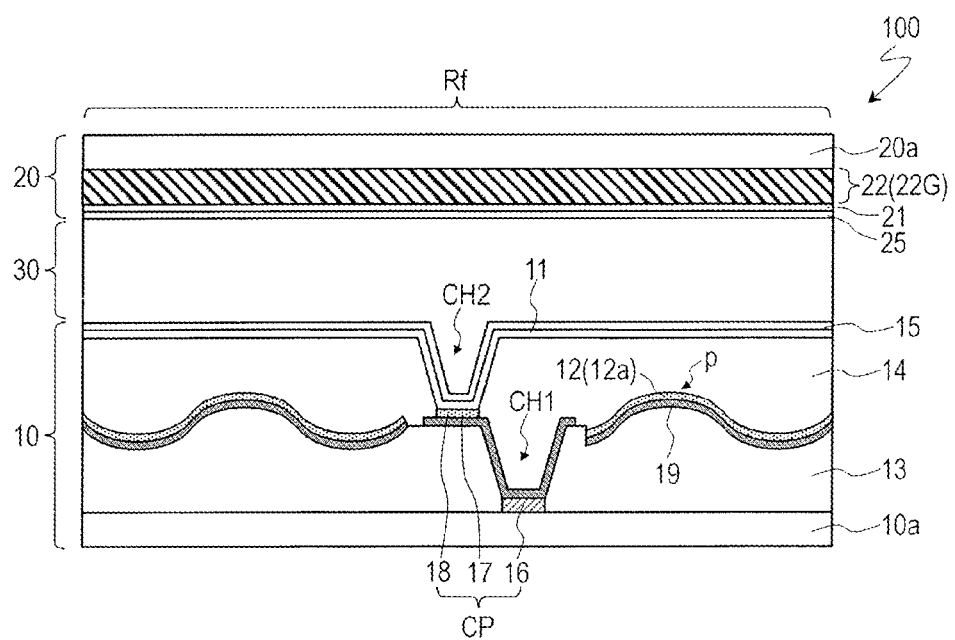
FIG. 2B is a cross-sectional view schematically illustrating the liquid crystal display device 100, and illustrates a cross-sectional structure taken along a line 2B-2B' in FIG. 1.

A liquid crystal display device 100 according to the present embodiment will be described with reference to FIG. 1, FIG. 2A, and FIG. 2B. The liquid crystal display device 100 of the present embodiment is a reflective liquid crystal display device. FIG. 1 is a plan view schematically illustrating the liquid crystal display device 100 and illustrates a region corresponding to three pixels P in the liquid crystal display device 100. FIG. 2A and FIG. 2B are cross-sectional views schematically illustrating the liquid crystal display device 100 and illustrate cross-sectional structures along the lines 2A-2A' and 2B-2B' in FIG. 1, respectively.

The liquid crystal display device 100 includes a plurality of pixels P as illustrated in FIG. 1. The plurality of pixels P are arrayed in a matrix shape including a plurality of rows and a plurality of columns. The plurality of pixels P typically include red pixels $P_R$ that display red, green pixels $P_G$ that display green, and blue pixels $P_B$ that display blue.

As illustrated in FIGS. 2A to 2B, the liquid crystal display device 100 includes a TFT substrate (first substrate) 10, a counter substrate (second substrate) 20 opposite to the TFT substrate 10, and a vertical alignment liquid crystal layer 30 provided between the TFT substrate 10 and the counter substrate 20. Each pixel P includes a reflective region Rf for displaying in a reflection mode, and does not include a region for displaying in a transmission mode (that is, a transmissive region).

The TFT substrate 10 includes a pixel electrode 11 provided to each of the plurality of pixels P, and a reflective electrode 12 located on a side opposite to the liquid crystal layer 30 with respect to the pixel electrode 11 (in other words, more toward a back face side than the pixel electrode 11). The TFT substrate 10 further includes a first interlayer insulating layer 13, a second interlayer insulating layer 14, a contact portion CP, and a first alignment film 15.

The constituent elements of the TFT substrate 10 (the pixel electrode 11 and the like described above) are supported by a substrate 10a. The substrate 10a is, for example, a glass substrate or a plastic substrate.

A circuit (backplane circuit) (not illustrated) for driving pixels P is formed on the substrate 10a. Here, the backplane circuit has a memory circuit (SRAM for example) connected to each of the plurality of pixels P. A liquid crystal display device in which the memory circuit is provided for each pixel P may be referred to as a "memory liquid crystal". Specific configurations of a memory liquid crystal are disclosed in, for example, JP 5036864 B (corresponding to U.S. Pat. No. 8,692,758). The entire disclosures of JP 5036864 B and U.S. Pat. No. 8,692,758 are incorporated herein by reference.

The first interlayer insulating layer 13 is provided to cover the backplane circuit. The first interlayer insulating layer 13 has a surface with a concave-convex shape. Thus, the first interlayer insulating layer 13 has a concave-convex surface structure. The first interlayer insulating layer 13 having the concave-convex surface structure may be formed by using a photosensitive resin, as described, for example, in JP 3394926 B.

The reflective electrode 12 is provided on the first interlayer insulating layer 13. The reflective electrode 12 is formed from a metal material with high reflectance. Here, a silver alloy is used as the metal material for forming the reflective electrode 12, but the present disclosure is not limited to this, and for example, aluminum or an aluminum alloy may be used. The surface of the reflective electrode 12 has a concave-convex shape corresponding to the concave-convex surface structure of the first interlayer insulating layer 13. In other words, the reflective electrode 12 also has a concave-convex surface structure. The concave-convex surface structure of the reflective electrode 12 is provided to diffusely reflect ambient light to achieve display similar to paper white. The concave-convex surface structure can, for example, be constituted by a plurality of convex portions p arranged randomly such that a center spacing between adjacent convex portions p is 5 µm or more and 50 µm or less, and preferably 10 µm or more and 20 µm or less. When viewed from the normal direction of the substrate 10a, the shapes of the convex portions p are substantially circular or substantially polygonal. The area of the convex portions p occupying the pixel P is, for example, from approximately 20% to 40%. The height of the convex portions p is 1 µm or more and 5 µm or less, for example.

The second interlayer insulating layer 14 is a transparent insulating layer provided to cover the reflective electrode 12.

The pixel electrode 11 is provided on the second interlayer insulating layer 14. Thus, the pixel electrode 11 is provided on the reflective electrode 12 with the transparent insulating layer 14 interposed therebetween. The pixel electrode 11 is formed from a transparent conductive material. As the transparent conductive material, for example, indium tin oxide (ITO), indium zinc oxide (IZO (trade name)), or a mixture thereof may be used. The pixel electrode 11 is electrically connected to a backplane circuit including a memory circuit.

The contact portion CP electrically connects the pixel electrode 11 and the backplane circuit in a first contact hole CH1 formed in the first interlayer insulating layer 13 and a second contact hole CH2 formed in the second interlayer insulating layer 14. In the illustrated example, the contact portion CP includes a first contact electrode 16, a second contact electrode 17, and a third contact electrode 18.

The first contact electrode 16 is an electrode (or a portion of wiring) exposed in the first contact hole CH1. The second contact electrode 17 is formed on the first interlayer insulating layer 13 and in the first contact hole CH1, and is connected to the first contact electrode 16 in the first contact hole CH1. The second contact electrode 17 is partially exposed in the second contact hole CH2. In the second contact hole CH2, the third contact electrode 18 is connected to the second contact electrode 17 and the pixel electrode 11. In other words, the third contact electrode 18 is interposed between the second contact electrode 17 and the pixel electrode 11. In the illustrated example, the conductive layer 19 formed from the same conductive film as the second contact electrode 17 (that is, in the same layer as the second contact electrode 17) is interposed between the reflective electrode 12 and the first interlayer insulating layer 13. The third contact electrode 18 is formed from the same metal film as the reflective electrode 12 (that is, in the same layer as the reflective electrode 12). The conductive layer 19 and the third contact electrode 18 may be omitted.

The counter substrate 20 includes a counter electrode (common electrode) 21 and a second alignment film 25. The counter substrate 20 further includes a color filter layer 22 and a plurality of columnar spacers (not illustrated). The constituent elements of the counter substrate 20 (the counter electrode 21 and the like described above) are supported by a substrate 20a. The substrate 20a is, for example, a glass substrate or a plastic substrate. Note that the counter substrate 20 does not have a black matrix (light-shielding layer) between any two pixels P adjacent to each other.

The counter electrode 21 is provided to be opposite to the pixel electrode 11 and the reflective electrode 12. The counter electrode 21 is formed from a transparent conductive material. A material similar to that of the pixel electrode 11 can be used as the transparent conductive material for forming the counter electrode 21.

The color filter layer 22 typically includes a red color filter 22R provided in a region corresponding to a red pixel $P_R$, a green color filter 22G provided in a region corresponding to the green pixel $P_G$, and a blue color filter 22B provided in a region corresponding to the blue pixel $P_B$. The red color filter 22R, the green color filter 22G, and the blue color filter 22B transmit red light, green light, and blue light, respectively. The red color filter 22R, the green color filter 22G, and the blue color filter 22B do not overlap with each other when viewed in a display surface normal direction.

The columnar spacer defines the thickness (cell gap) of the liquid crystal layer 30. The columnar spacer can be formed from a photosensitive resin.

The liquid crystal layer 30 includes a nematic liquid crystal material having negative dielectric anisotropy, and a chiral agent. The liquid crystal layer 30 can be formed, for example, by the falling drop method.

The first alignment film 15 and the second alignment film 25 are each provided to be in contact with the liquid crystal layer 30. Here, each of the first alignment film 15 and the second alignment film 25 is a vertical alignment film. At least one of the first alignment film 15 and the second alignment film 25 is subjected to the alignment processing and defines a pretilt azimuthal direction. Liquid crystal molecules 31 of the liquid crystal layer 30 are vertically aligned in a state where no voltage is applied to the liquid crystal layer 30 (see FIG. 2A), and tilt to be in twisted alignment when a predetermined voltage is applied to the liquid crystal layer 30. The liquid crystal layer 30 is a vertical alignment liquid crystal layer as described above.

Although not illustrated in this example, the liquid crystal display device 100 further includes a polarizer disposed on the observer side of the liquid crystal layer 30. Furthermore, a retardation plate may be provided between the polarizer and the liquid crystal layer 30. The polarizer (and the retardation plate) is arranged, for example, for displaying in the normally black mode.

The reflective electrode 12 includes a first region 12a located within each of the plurality of pixels P and a second region 12b located between any two pixels P adjacent to each other. The concave-convex surface structure of the reflective electrode 12 is formed in each of the first region 12a and the second region 12b. Thus, not only the first region 12a but also the second region 12b has a concave-convex surface structure.

In the liquid crystal display device 100, any of the following drive modes is used.

Mode (A): voltage of the same polarity is applied to the liquid crystal layers 30 of any two pixels P adjacent to each other along the row direction, among the plurality of pixels P. This is a drive mode known as row line inversion drive (H-line inversion drive), and also includes a mode in which polarity is reversed for each set of a plurality of rows (such as 2H-line inversion driving).

Mode (B): voltage of the same polarity is applied to the liquid crystal layers 30 of any two pixels P adjacent to each other along the column direction, among the plurality of pixels P. This is a drive mode known as column line inversion drive (V-line inversion drive), and also includes a mode in which polarity is reversed for each set of a plurality of columns (such as 2V-line inversion driving).

Mode (C): voltage of the same polarity is applied to the liquid crystal layers 30 of all of the plurality of pixels P. This is a drive mode known as field inversion driving (frame inversion driving).

In the liquid crystal display device 100, different potentials are provided to the counter electrode 21 and the reflective electrode 12. Here, the reflective electrode 12 is provided with the same potential as the potential provided to the pixel electrode 11 during maximum gray scale display (hereinafter, also referred to as "white display potential").

As described above, in the liquid crystal display device 100 of the present embodiment, the reflective electrode 12 not only includes the first region 12a located in the pixel P, but also includes the second region 12b located between two adjacent pixels P. Therefore, the region between the pixels P can also contribute to the reflection display so that the reflectance opening ratio (the ratio occupied by the region contributing to display of the reflection mode in the display region) is improved, whereby the reflectance can be further improved. Thus, even brighter display can be implemented in the reflection mode. Note that in a known reflective liquid crystal display device, the pixel electrode is a reflective electrode (the reflective electrode functions as a pixel electrode), and thus the reflective electrode cannot be disposed between pixels.

Furthermore, in the liquid crystal display device 100 of the present embodiment, the driving is performed in any of the modes (A), (B), and (C) described above. As a result, reflectance (brighter display) can be more effectively improved. The reasons for this will be described below.

As the drive mode for a liquid crystal display device, a method called dot inversion driving is well known and widely used. With dot inversion driving, voltages of different polarities are applied to the liquid crystal layers of any two pixels adjacent to each other, among the plurality of pixels. Thus, the polarity of the applied voltage is reversed for each pixel along the row direction, and the polarity of the applied voltage is reversed for each pixel along the column direction. In a case where the polarity of the voltage applied to the liquid crystal layer between adjacent pixels is reversed, as in the case of the dot inversion driving, the liquid crystal molecules located between the pixels may not be aligned in a way that contributes to brightness, due to the effect of the oblique electric field generated between the pixels.

On the other hand, in the present embodiment, the polarity of the applied voltage is the same (not inverted) between adjacent pixels P along at least one of the row direction and the column direction. Thus, the liquid crystal molecules 31 located between the pixels P to which the voltages of the same polarity are applied can be aligned to contribute to brightness. As a result, the reflectance can be more effectively improved. Note that for achieving even greater improvement in reflectance, the mode (C) is more preferable than the modes (A) and (B). Specifically, the field inversion drive in which a voltage of the same polarity is applied to the liquid crystal layers 30 of all of the plurality of pixels P is preferable.

In addition, as described above, in the present embodiment, the counter electrode 21 and the reflective electrode 12 are provided with potentials different from each other.

Alternatively, the reflective electrode 12 may be provided with the same potential as the potential provided to the counter electrode 21 (common potential). However, this results in a problem in that a section between the pixels P is dark during white display, due to a failure to apply a voltage of sufficient magnitude to the liquid crystal layer 30 between two adjacent pixels P.

On the other hand, as in the present embodiment, by providing different potentials to the counter electrode 21 and the reflective electrode 12, a voltage of sufficient magnitude can be applied to the liquid crystal layer 30 between the pixels P, whereby the section between the pixels P can be bright during white display. As a result, the reflectance can be even more effectively improved.

Example of Gray Scale Display

An example of a configuration for implementing gray scale display in the case of a memory liquid crystal will be described.

Figure 3:
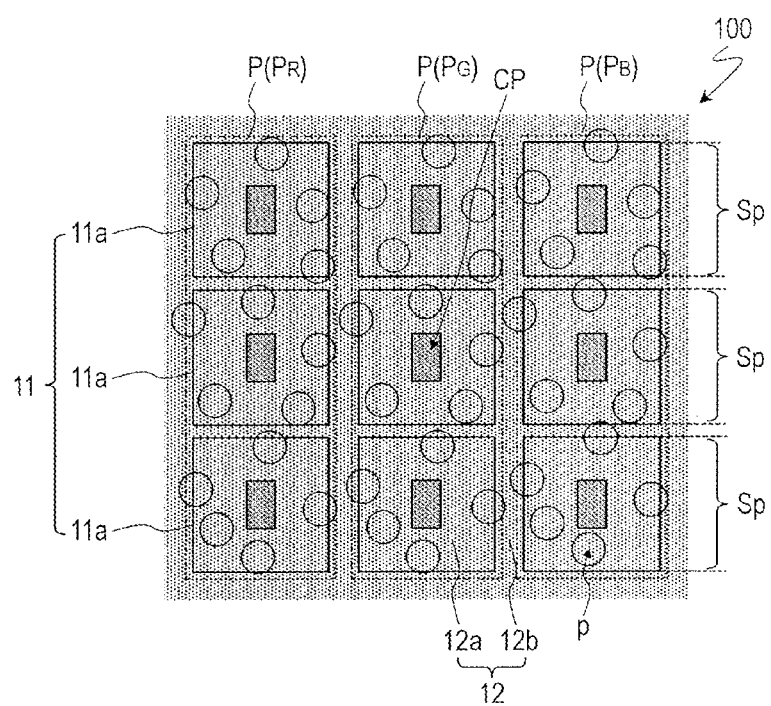
FIG. 3 is a plan view illustrating an example of a configuration in which each pixel P of the liquid crystal display device 100 is divided into a plurality of subpixels Sp.

Specifically, each pixel P may be divided into a plurality of subpixels Sp, as illustrated in FIG. 3. FIG. 3 illustrates an example in which one pixel P is divided into three subpixels Sp. In this example, the pixel electrode 11 is divided into three subpixel electrodes 11a. Of the three subpixel electrodes 11a, the two subpixel electrodes 11a disposed on the upper side and the lower side in the drawing are electrically connected to a single common memory circuit, and one subpixel electrode 11a disposed at the center of the diagram is electrically connected to another memory circuit. In other words, two memory circuits are provided for each pixel P.

Figure 4:
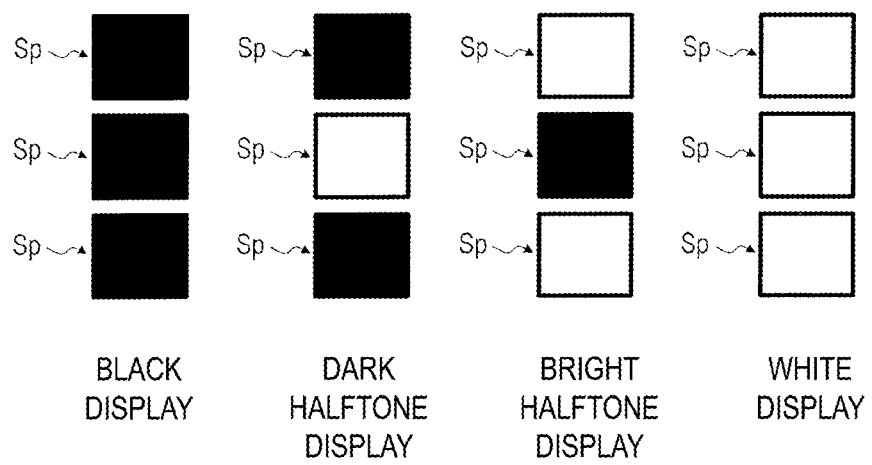
FIG. 4 is a diagram illustrating an example of gray scale display using the configuration illustrated in FIG. 3.

With the pixel P divided as illustrated in FIG. 3, four gray scale display may be implemented by an area gradient method as illustrated in FIG. 4. Specifically, as illustrated on the leftmost part in FIG. 4, by setting all three subpixels Sp to the black display state, the entire pixel P can be displayed in black. As illustrated second from the left in FIG. 4, by setting two subpixels Sp to the black display state and one subpixel Sp to the white display state, a dark halftone display can be performed for the entire pixel P. As illustrated third from the left in FIG. 4, by setting two subpixels Sp to the white display state and one subpixel Sp to the black display state, a bright halftone display can be performed for the entire pixel P. As illustrated on the rightmost part in FIG. 4, by setting all three subpixels Sp to the white display state, the entire pixel P can be displayed in white.

Note that the three subpixel electrodes 11a may be electrically connected respectively to different memory circuits (that is, three memory circuits may be provided for each pixel P).

Validation Results for Reflectance Improvement Effect

The liquid crystal display device 100 of the present embodiment (Example 1) was manufactured and the results of verifying the effect of improving the reflectance will be described. The fabricated liquid crystal display device 100 had a screen size of the 1.2 inches, and the size of one pixel P was 126 μm (vertical)×42 μm (horizontal). Of the first alignment film 15 of the TFT substrate 10 and the second alignment film 25 of the counter substrate 20, the rubbing processing was performed only on the second alignment film 25. As a result, the pretilt azimuthal direction was defined by only the second alignment film 25 of the first alignment film 15 and the second alignment film 25. The thickness (cell gap) of the liquid crystal layer 30 was 3 μm, and a chiral agent was added to the liquid crystal material of the liquid crystal layer 30 to achieve a twist angle of 70° upon application of a white voltage. Field inversion driving (mode (C)) was used as the drive mode.

Table 1 shows the potentials provided to the counter electrode 21, the pixel electrode 11, and the reflective electrode 12 in Example.

TABLE 1

| Potential provided (V) | White display | | Black display | |
|---|---|---|---|---|
| | First polarity | Second polarity | First polarity | Second polarity |
| Counter electrode | 0 | +3 | 0 | +3 |
| Pixel electrode | +3 | 0 | 0 | +3 |
| Reflective electrode | +3 | 0 | +3 | 0 |

By periodically switching between the first polarity and the second polarity shown in Table 1, a voltage of ±3 V was applied between the counter electrode 211 and the pixel electrode 12 during white display, and a voltage of 0 V was applied during black display. The voltage of ±3 V was applied between the counter electrode 21 and the reflective electrode 12 during both white display and black display.

In addition to Example, a liquid crystal display device of Comparative Example was also prepared for comparison with Example. The liquid crystal display device of Comparative Example differs from Example in that the same potential is provided to the counter electrode and the reflective electrode. Table 2 shows the potentials provided to the counter electrode, the pixel electrode, and the reflective electrode in Comparative Example.

TABLE 2

| Potential provided (V) | White display | | Black display | |
| --- | --- | --- | --- | --- |
|  | First polarity | Second polarity | First polarity | Second polarity |
| Counter electrode | 0 | +3 | 0 | +3 |
| Pixel electrode | +3 | 0 | 0 | +3 |
| Reflective electrode | 0 | +3 | 0 | +3 |

By periodically switching between the first polarity and the second polarity shown in Table 2, a voltage of ±3 V was applied between the counter electrode and the pixel electrode during white display, and a voltage of 0 V was applied during black display. The voltage of 0 V was applied between the counter electrode and the reflective electrode during both white display and black display.

Table 3 shows the reflectance (white reflectance) during white display, reflectance during black display (black reflectance), and contrast ratio according to Example and Comparative Example.

TABLE 3

|  | White reflectance (%) | Black reflectance (%) | Contrast ratio |
| --- | --- | --- | --- |
| Example | 8.8 | 0.37 | 24 |
| Comparative Example | 8.0 | 0.37 | 22 |

As shown in Table 3, white reflectance that is about 10% higher than that in Comparative Example was achieved with Example. On the other hand, black reflectance was the same for Example and Comparative Example. Example achieved improvement in the contrast ratio over that achieved in Comparative Example. This improvement in white reflectance achieved by Example is thought to be due to a larger contribution of the liquid crystal layer 30 between the pixels P to white display, as a result of the voltage applied between the counter electrode 21 and the reflective electrode 12 being the same as the voltage applied between the counter electrode 21 and the pixel electrode 11 during white display.

Figure 5A:
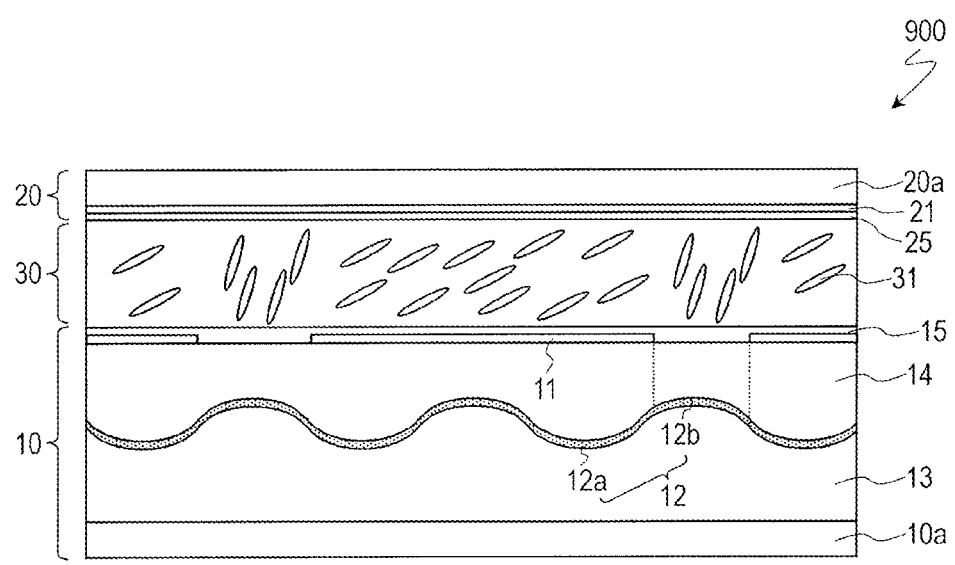
FIG. 5A is a diagram schematically illustrating an alignment state during white display in a liquid crystal display device 900 of Comparative Example.
Figure 5B:
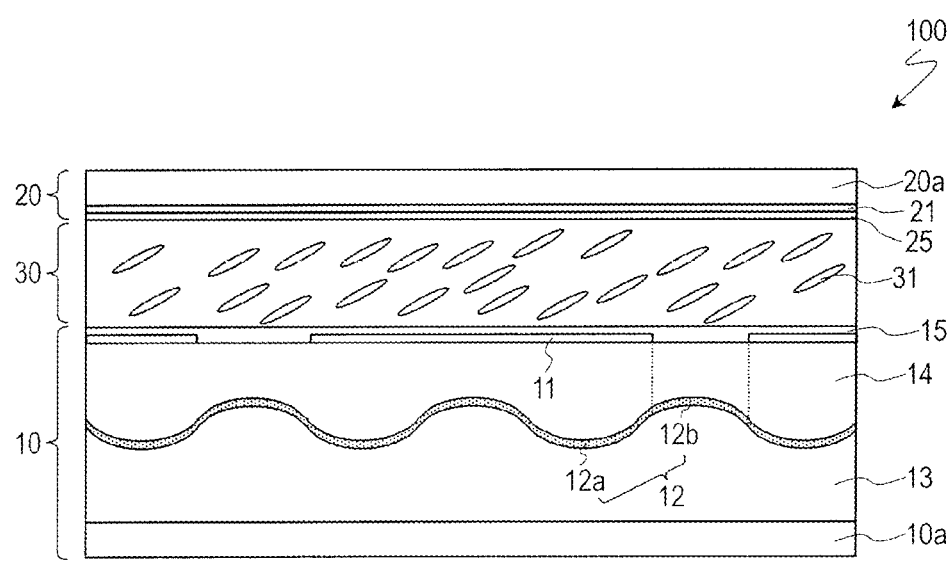
FIG. 5B is a diagram schematically illustrating an alignment state during white display in a liquid crystal display device 100 of Example.

FIG. 5A schematically illustrates the alignment state in a liquid crystal display device 900 of Comparative Example during white display. FIG. 5B schematically illustrates the alignment state in the liquid crystal display device 100 of Example during white display. The liquid crystal display device 900 of Comparative Example illustrated in FIG. 5A has the same configuration as the liquid crystal display device 100 of Example except that the same potential is provided to the counter electrode 21 and the reflective electrode 12. Note that in FIG. 5A and FIG. 5B, the color filter layer 22 and the conductive layer 19 are omitted.

In the liquid crystal display device 900 of Comparative Example, as illustrated in FIG. 5A, during white display, a voltage of sufficient magnitude is not applied between the counter electrode 21 and the reflective electrode 12. Thus, the liquid crystal molecules 31 between the pixels P do not tilt sufficiently. Therefore, the liquid crystal layer 30 between the pixels P does not sufficiently contribute to white display. On the other hand, in the liquid crystal display device 100 of Example, as illustrated in FIG. 5B, during white display, a voltage of sufficient magnitude is applied between the counter electrode 21 and the reflective electrode 12. Thus, the liquid crystal molecules 31 of the liquid crystal layer 30 between the pixels P tilt sufficiently. Therefore, the liquid crystal layer 30 between the pixels P sufficiently contributes to white display.

In the liquid crystal display device 100 of the present embodiment, the voltage applied between the reflective electrode 12 and the counter electrode 21 is the same during black display and during white display. Thus, the black reflectance might increase or the contrast ratio might be compromised. Still, as shown in Table 3, this study has proven for the first time that this is not the case (that is, the black reflectance does not increase). The reason why the black reflectance does not increase is thought to be as follows.

As illustrated in FIG. 2A and FIG. 2B, the reflective electrode 12 is located under the second interlayer insulating layer 14, while the pixel electrode 11 is located over the second interlayer insulating layer 14. In other words, the pixel electrode 11 is located closer to the liquid crystal layer 30 than the reflective electrode 12 is. Thus, it is thought that the potential of the reflective electrode 12 under the second interlayer insulating layer 14 did not have an impact large enough to affect display during black display, due to the electric field produced by the pixel electrode 11 and the counter electrode 12 having a dominant impact on the alignment of the liquid crystal layer 30.

Note that although the case where the white display potential is provided to the reflective electrode 12 is described, the potential provided to the reflective electrode 12 is not limited to the white display potential. Still, from the viewpoint of improving the reflectance, the potential provided to the reflective electrode 12 is preferably such that a potential difference between the counter electrode 21 and the reflective electrode 12 becomes as large as possible, and is most preferably the white display potential.

In the specification of the present application, the gray scale is expressed based on 256 gray scale display, and N gray scales in 256 gray scale display is referred to as "N/255 gray scale" unless stated otherwise. For example, "127/255 gray scale display" does not necessarily mean that the liquid crystal display device employs 256 gray scale display. The description not only includes 127 gray scale display in 256 gray scale display, but also includes 508 gray scale display in 1024 gray scale display.

From the viewpoint of improving the reflectance, the voltage applied between the reflective electrode 12 and the counter electrode 21 is preferably equal to or higher than that applied between the pixel electrode 11 and the counter electrode 21 for 127/255 gray scale display, for example.

Note that in the liquid crystal display device 100 of the present embodiment, the region between the pixels P contributes to display in the reflection mode. Thus, the counter substrate 20 preferably does not include a black matrix between any two pixels P, of the plurality of pixels P, adjacent to each other. For the same reason, the red color filter 22R, the green color filter 22G, and the blue color filter 22B preferably do not overlap with each other when viewed in the display surface normal direction.

In addition, in the present embodiment, the transparent insulating layer 14 is provided to cover the reflective electrode 12, and the pixel electrode 11 formed from the transparent conductive material is disposed on the transparent insulating layer 14. Thus, the pixel electrode 11 formed from the transparent conductive material and the counter electrode 21 formed from the transparent conductive material face each other with the liquid crystal layer 30 interposed in between. On the other hand, in a typical reflective liquid crystal display device, the pixel electrode is a reflective electrode, and thus a pixel electrode (reflective electrode) formed from a metal material and a counter electrode formed from a transparent conductive material are provided opposite to each other with a liquid crystal layer interposed therebetween. Thus, flickering may occur due to the difference in work function between the metal material and the transparent conductive material. In the present embodiment, the pixel electrode 11 and the counter electrode 21 are formed from the same type of electrode material (both are formed from a transparent conductive material), whereby such occurrence of flickering is suppressed.

Other Aspects

Here, a backplane circuit having a memory circuit for each pixel P is described, but the backplane circuit is not limited to this example. The backplane circuit may include a TFT connected to the pixel electrode 11, and a gate bus line, a source bus line, and the like connected to the TFT, as in a typical active matrix substrate. The TFT is, for example, a TFT having an oxide semiconductor layer including an amorphous silicon layer, a polysilicon layer, or an In—Ga—Zn—O-based semiconductor (see JP 2014-007399 A) as an active layer. JP 2014-007399 A is incorporated herein by reference.

Although an example where only one of the vertical alignment films may be in a VA-HAN mode, which defines the pretilt azimuthal direction is described as Example, both of the vertical alignment films may be in a VA-TN mode which defines the pretilt azimuthal direction.

Second Embodiment

Figure 6:
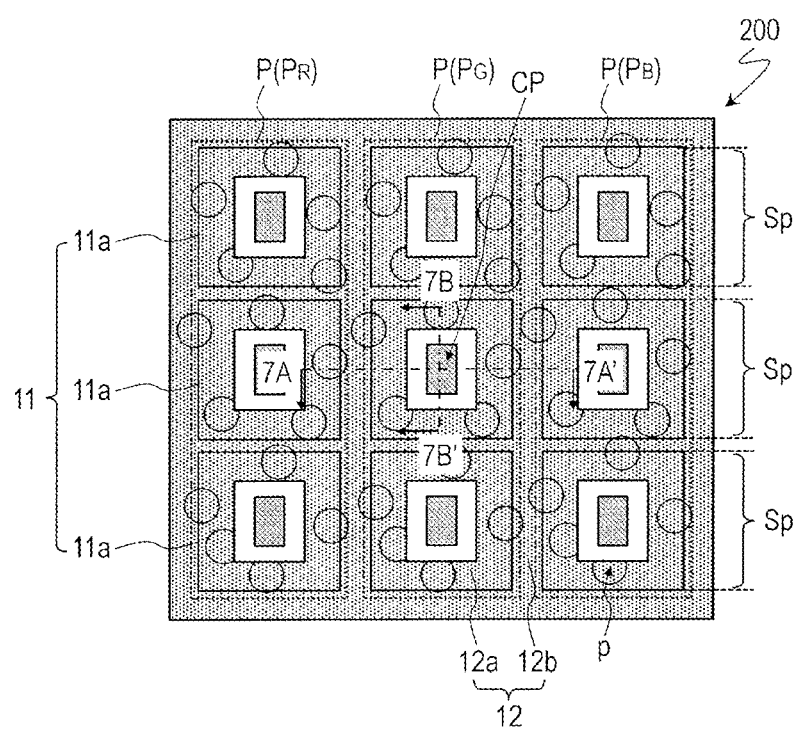
FIG. 6 is a plan view schematically illustrating another liquid crystal display device 200 according to an embodiment of the present disclosure and illustrates a region corresponding to three pixels P of the liquid crystal display device 200.
Figure 7A:
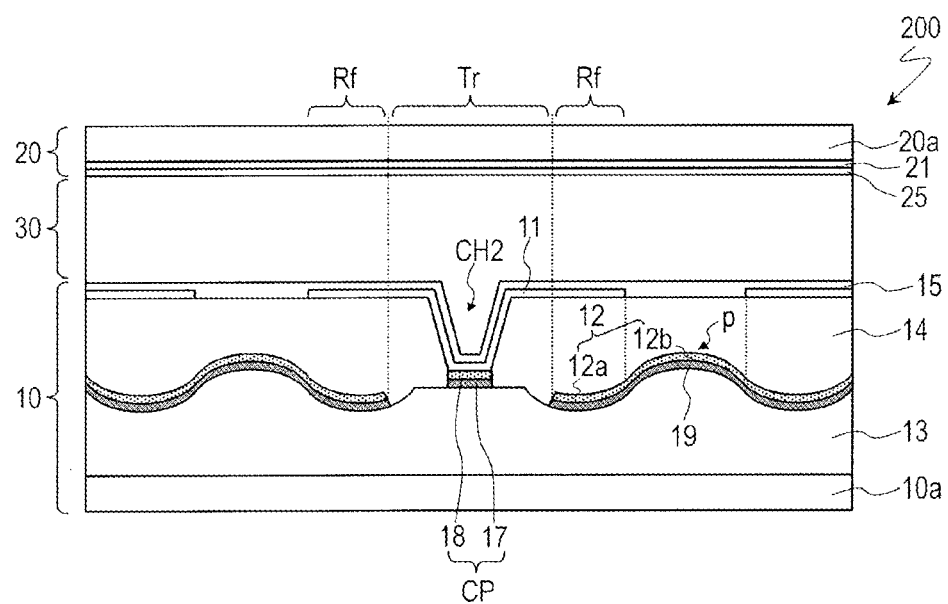
FIG. 7A is a cross-sectional view schematically illustrating the liquid crystal display device 200 and illustrates a cross-sectional structure along a line 7A-7A' in FIG. 6.
Figure 7B:
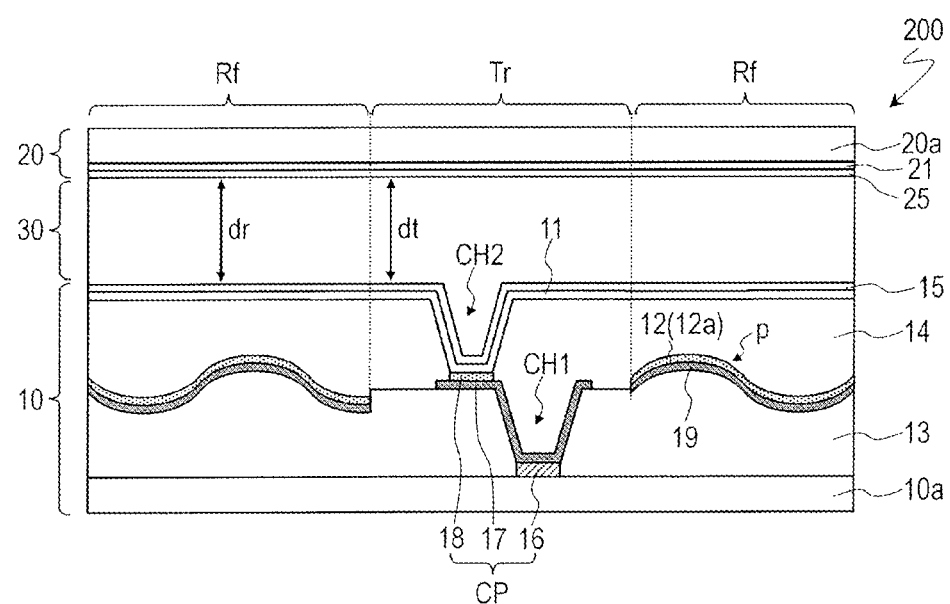
FIG. 7B is a cross-sectional view schematically illustrating the liquid crystal display device 200, and illustrates a cross-sectional structure taken along a line 7B-7B' in FIG. 6.

A liquid crystal display device 200 according to the present embodiment will be described with reference to FIG. 6, FIG. 7A, and FIG. 7B. The liquid crystal display device 200 of the present embodiment is a transflective liquid crystal display device. FIG. 6 is a plan view schematically illustrating the liquid crystal display device 200 and illustrates a region corresponding to three pixels P in the liquid crystal display device 200. FIG. 7A and FIG. 7B are cross-sectional views schematically illustrating the liquid crystal display device 200 and illustrate cross-sectional structures along the lines 7A-7A' and 7B-7B' in FIG. 6, respectively. The following description will primarily focus on differences between the liquid crystal display device 200 of the present embodiment and the liquid crystal display device 100 of the first embodiment.

The liquid crystal display device 200 of the present embodiment differs from the liquid crystal display device 100 of the first embodiment in that each of the plurality of pixels P includes a transmissive region Tr for displaying in the transmission mode, in addition to the reflective region Rf. A portion of the pixel electrode 11 is located in the transmissive region Tr. In the illustrated example, the transmissive region Tr is located at the center of the pixel P. In the illustrated example, a thickness (cell gap) dt of the liquid crystal layer 30 in the transmissive region Tr and a thickness (cell gap) dr of the liquid crystal layer 30 in the reflective region Rf are the same (thus, dt=dr).

The area of the transmissive region Tr occupying the pixel P may be appropriately set depending on the application and the like, and is, for example, 20% or more and 90% or less. The position and the shape of the transmissive region Tr within the pixel P may also be appropriately set depending on the application or the like.

Also, in the liquid crystal display device 200 of the present embodiment, since the reflective electrode 12 includes a second region 12b located between two adjacent pixels P, the region between the pixels P can also contribute to the reflective display. As a result, the reflection opening ratio is improved, whereby the reflectance can be further improved.

Also, in the liquid crystal display device 200 of the present embodiment, different potentials are provided to the counter electrode 21 and the reflective electrode 12, whereby a voltage of sufficient magnitude can be applied to the liquid crystal layer 30 between the pixels P and thus the section between the pixels P can be bright during white display. As a result, the reflectance can be even more effectively improved.

Furthermore, the liquid crystal display device 200 of the present embodiment may solve the following problems in a known transflective liquid crystal display device.

A known configuration of a transflective liquid crystal display device has a region between adjacent pixels used for display in the transmission mode. However, since there is no pixel electrode between pixels, the liquid crystal molecules located between the pixels cannot be aligned sufficiently in the desired direction, and thus there has been a problem in that the transmittance is low. In addition, a section between pixels includes regions in which the alignment as a result of an oblique electric field generated near the edge of the pixel electrode is not well aligned with the alignment as a result of rubbing processing, meaning that the liquid crystal molecules are unstably aligned. As described above, the regions in which the pixels are unstably aligned have been used for display in the transmission mode, and thus poor display (such as afterimage) caused by the poor alignment has occurred in display in the transmission mode. Furthermore, an impact of the change in alignment due to the concave-convex surface structure of the reflective electrode reaches the region between the pixels (the region used for transmission display), which is also another cause of poor display.

On the other hand, in the liquid crystal display device 200 of the present embodiment, since the pixel electrode 11 is provided in the transmissive region Tr, the liquid crystal molecules in the transmissive region Tr can be sufficiently aligned in the desired direction. Thus, transmittance is improved.

Furthermore, a region with stable alignment is used for display in the transmission mode, and the pixel electrode 11 does not need to have a concave-convex surface structure (only the reflective electrode 12 provided separately from the pixel electrode 11 needs to have the concave-convex surface structure). Thus, poor display caused by the poor alignment in display in the transmission mode can be improved.

Although a configuration is described in which the cell gap dt in the transmissive region Tr and the cell gap dr in the reflective region Rf are the same, a configuration in which the cell gap dt of the transmissive region Tr is greater than the cell gap dr of the reflective region Rf (that is, dt>dr) may be employed.

Light used for display in the transmission mode passes through the liquid crystal layer 30 only once, whereas the light used for display in the reflection mode passes through the liquid crystal layer 30 twice. Thus, when the cell gap dt of the transmissive region Tr is greater than the cell gap dr of the reflective region Rf, retardation of the liquid crystal layer 30 for the light used to display in the transmission mode and the light used to display in the reflection mode can be made close. Thus, a voltage-luminance characteristic is obtained that is preferable for both the transmissive region Tr and the reflective region Rf (enabling brighter display).

For implementing brighter display in both the transmissive region Tr and the reflective region Rf, the cell gap dt of the transmissive region Tr and the cell gap dr of the reflective region Rf preferably substantially satisfy the relationship dt=2dr.

Third Embodiment

Figure 8:
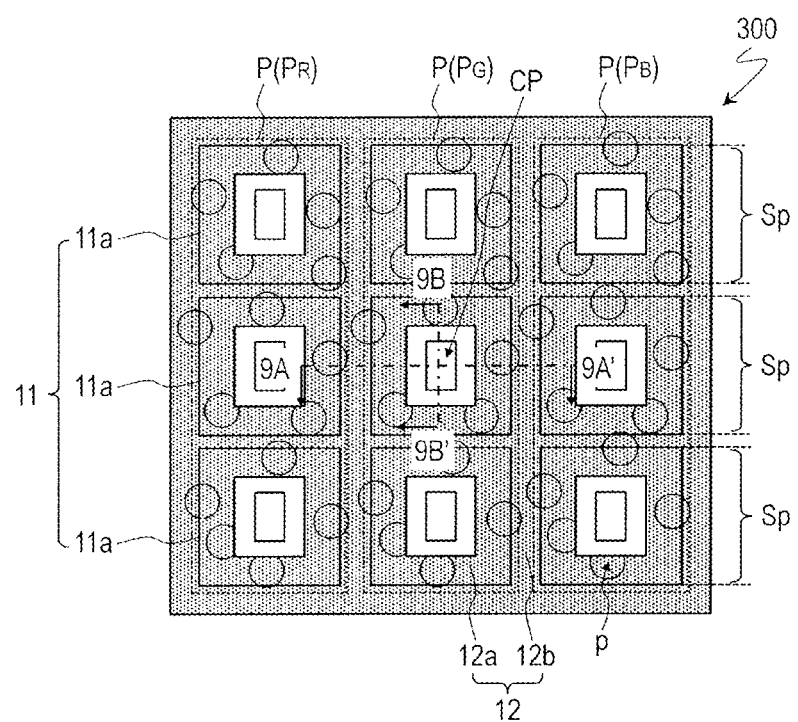
FIG. 8 is a plan view schematically illustrating yet another liquid crystal display device 300 according to an embodiment of the present disclosure and illustrates a region corresponding to three pixels P of the liquid crystal display device 300.
Figure 9A:
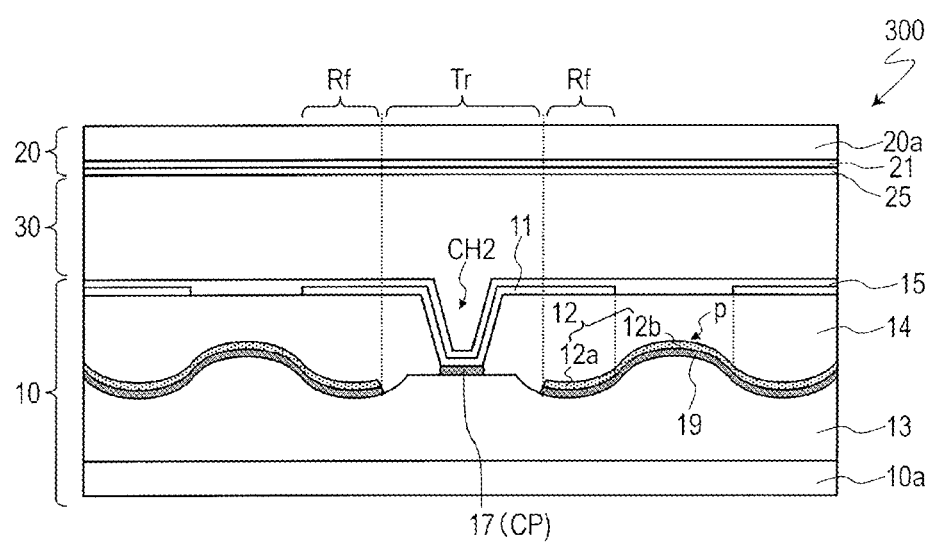
FIG. 9A is a cross-sectional view schematically illustrating the liquid crystal display device 300 and illustrates a cross-sectional structure along a line 9A-9A' in FIG. 8.
Figure 9B:
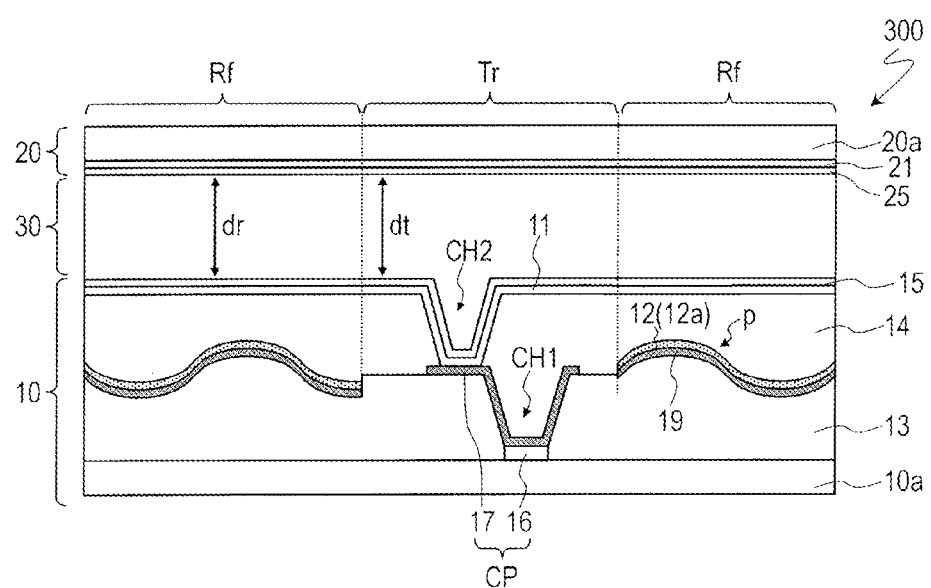
FIG. 9B is a cross-sectional view schematically illustrating the liquid crystal display device 300, and illustrates a cross-sectional structure taken along a line 9B-9B' in FIG. 8.

A liquid crystal display device 300 according to the present embodiment will be described with reference to FIG. 8, FIG. 9A, and FIG. 9B. The liquid crystal display device 300 of the present embodiment is a transflective liquid crystal display device. FIG. 8 is a plan view schematically illustrating the liquid crystal display device 300 and illustrates a region corresponding to three pixels P in the liquid crystal display device 300. FIG. 9A and FIG. 9B are cross-sectional views schematically illustrating the liquid crystal display device 300 and illustrate cross-sectional structures along the lines 9A-9A' and 9B-9B' in FIG. 8, respectively. The following description will primarily focus on differences between the liquid crystal display device 300 of the present embodiment and the liquid crystal display device 200 of the second embodiment.

The liquid crystal display device 300 of the present embodiment illustrated in FIG. 8, FIG. 9A, and FIG. 9B is different from the liquid crystal display device 200 of the second embodiment in that the contact portion CP, electrically connecting the pixel electrode 11 and the backplane circuit in the first contact hole CH1 and the second contact hole CH2 formed in the transmissive region Tr, is formed from a transparent conductive material (and thus is transparent).

In the present embodiment, the contact portion CP includes the first contact electrode 16 and the second contact electrode 17. Thus, unlike the contact portion CP of the liquid crystal display device 200 according to the second embodiment, the contact portion CP of the liquid crystal display device 300 does not include the third contact electrode 18 formed from the same metal film as the reflective electrode 12. The first contact electrode 16 and the second contact electrode 17 included in the contact portion CP of the liquid crystal display device 300 are both formed from a transparent conductive material. Thus, the contact portion CP of the liquid crystal display device 300 is transparent on the whole. A material similar to that of the pixel electrode 11 can be used as the transparent conductive material for forming the first contact electrode 16 and the second contact electrode 17.

As described above, in the liquid crystal display device 300 of the present embodiment, the contact portion CP is formed from a transparent conductive material, and therefore, the region in which the contact portion CP is provided can be used for display in the transmission mode (that is, the region in which the contact portion CP is provided can be suitably used as the transmissive region Tr). Therefore, the transmittance can be further improved over that in the liquid crystal display device 200 according to the second embodiment.

INDUSTRIAL APPLICABILITY

The embodiments of the present disclosure can be broadly applied to a liquid crystal display device (that is, a reflective liquid crystal display device and a transflective liquid crystal display device) including a reflective region in which pixels perform display in a reflection mode.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:
1. A liquid crystal display device comprising:
a first substrate;
a second substrate opposite to the first substrate;
a vertical alignment liquid crystal layer provided between the first substrate and the second substrate; and
a plurality of pixels arranged in a matrix shape including a plurality of rows and a plurality of columns,
wherein each of the plurality of pixels includes a reflective region configured to perform display in a reflection mode,
the first substrate includes
a reflective electrode including a first region located within each of the plurality of pixels and a second region located between any two pixels, of the plurality of pixels, adjacent to each other,
a transparent insulating layer provided to cover the reflective electrode, and
a pixel electrode formed from a transparent conductive material and provided on the transparent insulating layer in each of the plurality of pixels,
the second substrate includes a counter electrode provided opposite to the pixel electrode and the reflective electrode,
voltage of the same polarity is applied to the liquid crystal layer of any two pixels, of the plurality of pixels, adjacent to each other along a row direction, any two pixels, of the plurality of pixels, adjacent to each other along a column direction, or all of the plurality of pixels, and
the counter electrode and the reflective electrode are provided with potentials different from each other.
2. The liquid crystal display device according to claim 1, wherein the reflective electrode is provided with a potential that is the same as a potential provided to the pixel electrode during maximum gray scale display.
3. The liquid crystal display device according to claim 1, wherein the second substrate does not include a black matrix between any two pixels adjacent to each other, among the plurality of pixels.
4. The liquid crystal display device according to claim 1, wherein the second substrate includes a color filter layer including a first color filter that transmits first color light, a second color filter that transmits second color light, and a third color filter that transmits third color light, and
the first color filter, the second color filter, and the third color filter do not overlap with each other when viewed in a display surface normal direction.

5. The liquid crystal display device according to claim 1, wherein each of the plurality of pixels further includes a transmissive region configured to perform display in a transmission mode, and the pixel electrode is partially located in the transmissive region.

6. The liquid crystal display device according to claim 1, wherein the counter electrode is formed from a transparent conductive material.

7. The liquid crystal display device according to claim 1, further comprising:

memory circuits connected to the plurality of pixels, respectively.

8. The liquid crystal display device according to claim 1, wherein the first region and the second region of the reflective electrode each have a concave-convex surface structure.

* * * * *